Patented Nov. 8, 1932

1,887,183

UNITED STATES PATENT OFFICE

JOHN A. ERICKSON, OF JACKSON, MICHIGAN, ASSIGNOR TO VIKING MANUFACTURING COMPANY, A COPARTNERSHIP CONSISTING OF BERRY N. BEAMAN, ROBERT LAKE, AND JOHN A. ERICKSON, OF JACKSON, MICHIGAN

COAL BINDER AND METHOD OF APPLYING THE SAME

No Drawing.   Application filed June 25, 1932. Serial No. 619,273.

This invention relates to an improvement in binders for coal briquettes of molded coal screenings and the method for employing the same. Although in its broadest aspect, this invention is not limited to any particular type of briquette, it has particular application in the molding of coal briquette units of the type disclosed in my application, Serial No. 595,737, filed February 29, 1932.

Herebefore attempts have been made to employ cement as a binder for molding coal screenings into a usable unit. These attempts, however, have for the most part met with limited success for the reason that it was necessary to employ such a high ratio of cement to coal, by volume, that a great deal of ash resulted. Furthermore, a grayish unit resembling a cement block was produced by such a high ratio of cement to coal. Both of the foregoing disadvantages are exceedingly detrimental to the salability of the product.

The necessity for employing a high ratio of cement to coal, rarely leaner than 1 to 6, by volume, resided in the presence of a great deal of organic foreign matter in the coal screenings which has a delaying or stopping action upon the hardening or setting of the cement. Whenever a mixture substantially leaner than six parts of coal to one part of cement, by volume, is attempted, the setting of the cement is so retarded by the presence of organic foreign matter that the molded coal unit crumbles under the slightest handling. The organic foreign matter appears to retard the setting of the cement to the point that the water of the mixture evaporates before the cement can absorb the same sufficiently to take a set.

It became an object of this invention to provide a binder for coal briquettes which will permit to the employment of a lean mixture of cement to coal, as low as one to eighteen, by volume, and will eliminate the disadvantages connected with cement as a binder, herebefore designated.

In carrying this invention into operation, as low as one part of cement is mixed with eighteen parts of coal, by volume, and the mixture is sufficiently moistened with a solution of calcium chloride and water to give the mixture a workable consistency. In practice, from ten to forty pounds of calcium chloride per ton of coal dissolved in twenty-five gallons of water has been employed to give satisfactory results. This amount will vary depending upon the percentage of organic foreign matter present in the coal. Also, different grades of coal result in varying the amount of calcium chloride required to produce the maximum leanness of cement. Generally twenty pounds of calcium chloride per ton of coal or substantially 1% of calcium chloride to 99% of coal, by weight, will produce satisfactory results under average conditions. It is to be distinctly understood, however, that this invention is not limited to a specific binder formula of cement and calcium chloride for coal screenings, but resides broadly in the employment of calcium chloride with cement to bind the loose coal particles into a unit permitting the use of one part of cement to ten parts or more of finely divided coal particles.

In the event the coal dust and screenings to be molded into briquettes resulted from bin coal previously treated with calcium chloride to produce dustless coal as is customary among retail coal delears, it is only necessary to add cement to the coal screenings and moisten the mixture with sufficient water to give the same a workable consistency, for the reason that the amount of calcium chloride required to produce dustless coal approximates the amount necessary to give the maximum leanness of cement. It is obvious, however, that in using screenings from "dustless coal" that sometimes it may be necessary to increase the calcium chloride content to obtain the best results.

The addition of calcium chloride to the cement and coal mixture has the following beneficial effects upon the resulting coal briquette: (1) The setting action of the cement is accelerated. (2) It retains moisture in the molded units a sufficient period to enable the cement to set. (3) Because of its great affinity for water, the molded product retains a definite amount of moisture which is essential to satisfactory consumption as a fuel.

Throughout the foregoing description and the appended claims the term cement is intended to include both Portland and natural cement. Also, the employment of salts other than calcium chloride having decided affinity for moisture is anticipated.

Having thus described my invention, it will be apparent that changes and modifications may be made therein by those skilled in the art without departing from the spirit thereof and I do not wish to be limited to the specific details herebefore set forth but what I claim as my invention and desire to be protected by Letters Patent is:

1. A coal briquette comprising, coal particles, hydraulic cement, and a hygroscopic salt.

2. A fuel briquette comprising, a solid combustible carbonaceous material, hydraulic cement, and a hygroscopic substance in quantity sufficient to accelerate the setting of the cement.

3. A coal briquette comprising, a mixture of coal particles, Portland cement, and a hygroscopic salt.

4. A fuel briquette comprising, a solid combustile material, Portland cement, and a hygroscopic substance in sufficient quantity to accelerate the setting of the cement.

5. A molded fuel unit comprising hydraulic cement and coal particles in a ratio less than 1 to 10, by volume, and calcium chloride.

6. A molded fuel unit comprising hydraulic cement and coal particles in a ratio less than 1 to 10, by volume, and substantially 1% calcium chloride, by weight.

7. A molded fuel unit comprising substantially one part of hydraulic cement to substantially 18 parts of coal particles, by volume, and calcium chloride.

8. In a molded coal briquette, a binder comprising hydraulic cement in the proportion of substantially one part of cement to substantially 18 parts of coal, by volume, and calcium chloride in the proportion of substantially 1% of the coal, by weight.

9. A method of producing fuel products which comprises thoroughly mixing a moistened mixture of coal particles, hydraulic cement and calcium chloride, and molding said mixture in a suitable matrix.

10. A method of producing fuel products which comprises thoroughly mixing hydraulic cement with coal dust and screenings from coal previously treated with calcium chloride to produce dustless coal, moistening said mixture and molding said mixture in a suitable matrix.

11. A method of producing fuel products which comprises thoroughly mixing coal screenings with hydraulic cement, moistening said mixture with a solution of calcium chloride, and molding said mixture in a suitable matrix.

12. A method of producing fuel products which comprises thoroughly mixing a moistened mixture of coal particles, Portland cement and a hygroscopic salt in sufficient quantity to accelerate the setting of the cement and then molding the mixture in a suitable matrix.

13. A method of agglomerating fuel fines comprising moistening said fines with a solution of a deliquescent salt, adding sufficient hydraulic cement to bind said fuel particles, said solution being applied in quantity sufficient to hydrolize said cement and in salt concentration merely sufficient to accelerate the setting of said cement binder.

14. A method of producing fuel products which comprises combining substantially eighteen parts solid combustible carbonaceous material with substantially one part Portland cement, by volume, moistening the mixture with a solution comprising substantially one percent of calcium chloride, by weight, and then molding the mixture in a suitable matrix.

In testimony whereof I hereunto affix my signature.

JOHN A. ERICKSON